(12) United States Patent
Brady et al.

(10) Patent No.: US 8,465,627 B2
(45) Date of Patent: Jun. 18, 2013

(54) COMMINUTION AND DENSIFICATION OF BIOMASS PARTICLES

(75) Inventors: Michael Brady, Studio City, CA (US); Robert Bartek, Centennial, CO (US); Dennis Stamires, Dana Point, CA (US); Paul O'Connor, Hoevelaken (NL)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 12/934,006

(22) PCT Filed: Nov. 30, 2009

(86) PCT No.: PCT/US2009/066123
§ 371 (c)(1), (2), (4) Date: Feb. 3, 2011

(87) PCT Pub. No.: WO2010/063029
PCT Pub. Date: Jun. 3, 2010

(65) Prior Publication Data
US 2011/0114765 A1    May 19, 2011

Related U.S. Application Data

(60) Provisional application No. 61/118,483, filed on Nov. 28, 2008.

(51) Int. Cl.
*C10B 53/02* (2006.01)
*C10B 57/06* (2006.01)

(52) U.S. Cl.
USPC ............ 201/2.5; 44/606; 201/9; 201/20

(58) Field of Classification Search
USPC ........... 201/2.5, 9, 20, 38, 42, 7, 8; 44/505, 44/590, 606, 627, 905; 241/28; 585/240, 585/242
See application file for complete search history.

(56) References Cited

U.S. PATENT DOCUMENTS

| | | | | |
|---|---|---|---|---|
| 102,665 A | * | 5/1870 | Douglas | 201/38 |
| 353,998 A | * | 12/1886 | Wheeler | 201/38 |
| 1,538,505 A | * | 5/1925 | Atkinson | 423/445 R |
| 1,728,807 A | * | 9/1929 | Schwalbe | 201/20 |
| 1,831,105 A | * | 11/1931 | Fairley | 585/355 |
| 1,845,917 A | * | 2/1932 | Howard | 201/20 |
| 2,177,557 A | * | 10/1939 | Bergstrom | 562/515 |
| 4,201,551 A | | 5/1980 | Lyshkow et al. | |
| 4,797,135 A | * | 1/1989 | Kubat et al. | 44/500 |
| 5,171,592 A | | 12/1992 | Holtzapple et al. | |
| 5,269,947 A | * | 12/1993 | Baskis | 201/2.5 |
| 5,693,296 A | | 12/1997 | Holtzapple et al. | |
| 5,865,898 A | | 2/1999 | Holtzapple et al. | |
| 7,320,715 B2 | | 1/2008 | Shigehisa et al. | |
| 2010/0181183 A1 | * | 7/2010 | Koukios | 201/2.5 |
| 2010/0209965 A1 | * | 8/2010 | O'Connor et al. | 435/41 |

FOREIGN PATENT DOCUMENTS

| | | |
|---|---|---|
| EP | 1 719 811 | * 11/2006 |
| WO | WO 2007/128800 | 11/2007 |

OTHER PUBLICATIONS

Tucker, et al., "Effects of temperature and moisture on dilute-acid steam explosion pretreatment of corn stover and cellulase enzyme digestibility," Applied Biochemistry and Biotechnology, 105-108(1-3):165-177, (Spring 2003).
International Search Report in International Application No. PCT/US2009/066123 mailed Feb. 3, 2010.

* cited by examiner

*Primary Examiner* — Jill Warden
*Assistant Examiner* — Joye L Woodard
(74) *Attorney, Agent, or Firm* — Jennifer A. Camacho; Natalie Salem; Greenberg Traurig, LLP

(57) ABSTRACT

A method for reducing the mechanical strength of solid biomass material, in particular lignocellulosic biomass, comprises mixing the solid biomass material with an inorganic material and heating the solid biomass material mixture to a toasting temperature in the range of 105° C. to 140° C. during an exposure time of from 1 minute to 12 hours. Before or after the heat treatment, which is referred to as "toasting", the biomass material mixture is subject to flash heating. The treatment significantly reduces the mechanical energy required for reducing the particle size of the solid biomass material and is suitable as a pretreatment prior to a conversion reaction of the solid biomass material.

21 Claims, 1 Drawing Sheet

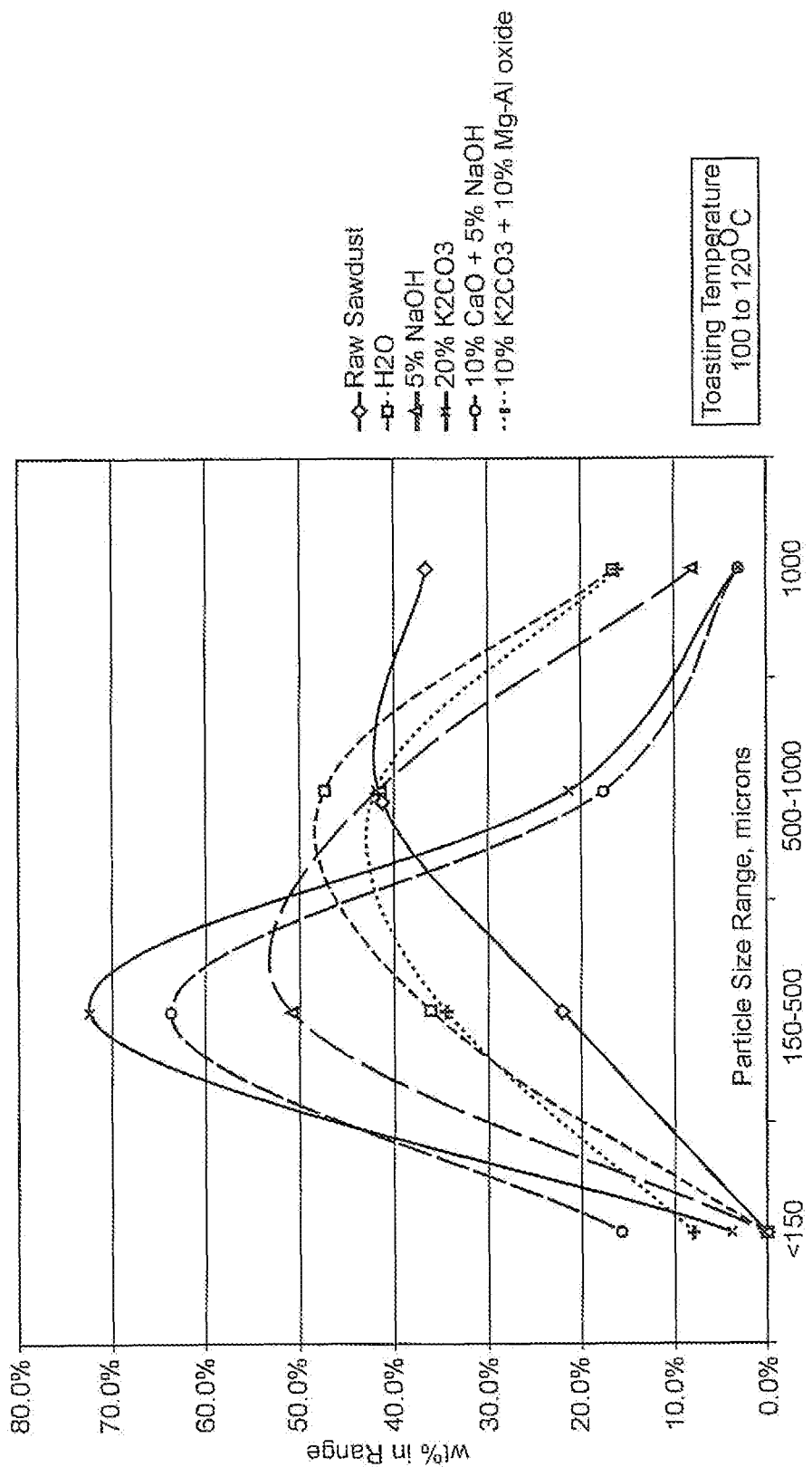

COMMINUTION AND DENSIFICATION OF BIOMASS PARTICLES

BACKGROUND OF THE INVENTION

1. Field of the Invention

The invention relates generally to a process for preparing biomass particles suitable for use in fast pyrolysis reaction systems, such as entrained flow, fluidized bed, ablative, vacuum, and cyclonic conversion reactors, and more particularly to a mild thermal pretreatment process for making biomass material more susceptible to mechanical particle size reduction processes.

2. Description of the Related Art

Prior art processes for reducing the particle size of biomass materials include methods such as milling, grinding, shredding, and the like. Because of the fibrous and resilient nature of many biomass materials, these processes require relatively large amounts of energy, and tend to result in fiber-like or needle-like particles.

Processes have been suggested for converting biomass material to gaseous or liquid products, in particular fuel products. The more promising of these processes comprise entrainment flow reactors or fluidized bed reactors. In general, the optimum particle shape for reactors of this type is a spherical shape.

Thus, there is a particular need for processes for reducing the particle size of solid biomass materials requiring less energy than prior art processes. There is a further need for such processes providing biomass particles having a more spherical shape than the processes known in the art.

BRIEF SUMMARY OF THE INVENTION

The present invention addresses these problems by providing a process for reducing the resistance of a solid biomass material to mechanical disintegration, said process comprising the step of exposing the solid biomass material to a toasting temperature in the range of from 105° C. to 200° C. during an exposure time of from 1 minute to 12 hours.

The invention further relates to the modified or toasted biomass material obtained by the process of the invention, and to the biomass particles obtained by comminuting the toasted biomass material.

Another aspect of the invention is a process for converting the biomass particles in a conversion reactor involving an entrained flow or a fluidized bed of the biomass particles, such as by a pyrolysis, catalytic pyrolysis or gasification process.

Another aspect of this invention is a process for converting toasted/comminuted biomass particles by a liquefaction process, including chemical, hydrothermal, hydropyrolytic, or enzymatic conversion.

BRIEF DESCRIPTION OF THE DRAWING

FIG. 1 shows the particle size distribution of different samples of saw dust, subjected to a standardized grinding process.

DESCRIPTION OF ILLUSTRATIVE EMBODIMENTS

The following is a description of certain embodiments of the invention, given by way of example only.

The process of the invention is particularly suited for biomass materials of plant origin. Nature provides plants with a high degree of resilience, so that plants may withstand strong forces, such as high winds, without breaking. Lignocellulosic plants, for example, form fibrous structures. The ability of plants to bend with the wind, rather than breaking, is proverbial.

The very properties that allow plants to withstand strong forces without breaking make it difficult to reduce the particle size of biomass material. Processes for reducing the particle size of a solid material generally involve applying mechanical force to the material. Examples include shredding, chipping, milling, grinding, kneading, etc. If the applied force exceeds the material's ability to absorb applied forces, the material will shatter or break, resulting in a reduction of its particle size. If, on the other hand, the material is capable of absorbing the mechanical energy applied to it, the energy will be converted to heat, but no particle size reduction takes place.

Nature has equipped plants, and plant-based biomass, with the ability to absorb mechanical energy applied to it. This ability makes it difficult to reduce the particle size of biomass material. Large amounts of energy are required to reduce the size of biomass particles below several centimeters.

Because of the fibrous nature of most biomass materials, small biomass particles tend to be fiber-like or needle-like. As used herein, the terms "fiber-like" and "needle-like", when used to describe particle shapes, refers to particles having a length-to-diameter ratio of 3 or greater.

For processes involving an entrained flow of particles or a fluidized bed of particles, it is desirable to provide particles having a uniform sphere-like shape. The term "sphere-like", as used herein to describe particle shapes, refers to particles having a length-to-diameter ratio of less than 3. Preferred are particles having a length-to-diameter ratio of less than 2, its being understood that fully spherical particles have a length-to-diameter ratio of 1.

The average length-to-diameter ratio of a particulate product can be determined by any technique known in the art. For example, a photomicrograph of a representative sample of the particles may be analyzed using a scanning camera and an appropriate computer algorithm.

In one aspect, the present invention is a process for reducing the resistance of a solid biomass material to mechanical disintegration, said process comprising the step of exposing the solid biomass material to a toasting temperature in the range of from 105° C. to 200° C. during an exposure time of from 1 minute to 12 hours. The process produces a modified biomass material.

For this heat treatment process we coin the term "toasting", which we define as a heat treatment of solid biomass material, in particular ligno-cellulosic biomass material, at a temperature in the range of from 105° C. to 200° C. This heat treatment may be carried out in the presence of oxygen-containing gas, such as air, or in an oxygen-poor or oxygen-free atmosphere, such as steam.

It is customary to prepare wood barrels for storing and aging wine by burning a fire of wood chips in a new barrel. The purpose is to "tame" the tannins present in the wood, so that the wine being stored in the barrel is still capable of taking up tannins from the wood, without, however, becoming overwhelmed by them. This process is also referred to as "toasting", but is not known to result in any appreciable reduction of the mechanical strength of the wood of the barrel.

By contrast, the process of the present invention has been found to result in a significant reduction of the mechanical strength of the biomass material. This is believed to be due to the fact that the biomass material is exposed to the toasting temperature long enough for the entire biomass particle to reach a temperature of at least 80° C. The required exposure time is a function of the particle size of the biomass being toasted.

The process of the invention is particularly suitable for lignocellulosic biomass materials. Suitable examples include wood, straw, grasses, bagasse, corn stover, and the like. Preferred are wood and straw, because of their abundant availability. It will be understood, however, that availability and abundance of specific lignocellulosic biomass materials is subject to geographic variation. For example, in sugar cane growing areas bagasse is likely to be more abundantly available than wood or straw.

It has been found that temperatures in the range of 105° C. to 140° C. are generally sufficient to obtain the desired reduction of the mechanical strength of the biomass material. It is desirable to avoid conversion of the biomass material. It is also desirable to reduce the energy requirements of the process. For these reasons it is generally preferred to operate in the lower part of the temperature range. That is, temperatures between 105° C. and 140° C. are generally preferred over temperatures in the range 140° C. to 200° C.

It is desirable to reduce the particle size of the biomass material to a range of several mm to several cm, prior to subjecting the biomass material to the toasting process. Such a primary particle size reduction does not consume inordinate amounts of energy, and makes the material easier to handle. For particle sizes in this range the exposure time desirably is in the range of 15 minutes to 2 hours.

Additionally, biomass material can be contacted with an organic compound before or during the toasting process. Then also, the organic compound can be in the form of a solution, including the water phase derived from the pyrolysis process.

As it is desirable to avoid conversion of the biomass material during the toasting process, it may be preferred to conduct the toasting step in an atmosphere that is substantially oxygen-free.

It has been found, however, that in many cases the presence of oxygen during the toasting step has no appreciable effect on the composition of the biomass. This is believed to be due in part to the relatively low temperature at which the toasting step is conducted. It is further believed to be due to the presence of moisture in virtually any biomass feedstock. Under the conditions of the toasting step the moisture will escape from the biomass particles, and may form a steam blanket around the biomass material, thereby protecting it from atmospheric oxygen. It will be understood that the cost of the process is lower if the process is carried out in air, as compared to carrying out the process in an atmosphere that is substantially oxygen-free.

The process of toasting of the biomass may be carried out in fluidized bed, fixed bed, transported bed or ebullated bed type of reactors. The process of the invention is particularly suitable for preparing the biomass material for a conversion process in an entrained flow, moving bed, ebullating bed, or fluid bed reactor, or cyclonic reactor, and the like.

FIG. 1 illustrates the effect of toasting on the response of saw dust particles to a standardized grinding step, as follows.

Eight kilograms of dried Canadian white pine wood particles and 30 kg of water were subjected to intense kneading and mixing in a Ross Kneader (Model AMK Kneader Extruder Type VIU). The kneader was provided with a heating jacket, which was kept at 115° C. The temperature of the wood mixture in the kneader was 95 to 105° C. The lid was kept close, to minimize evaporation. Mixing was continued for one hour.

After the one-hour kneading step the lid was opened to allow rapid evaporation of the moisture. The jacket temperature was maintained at 115° C. The wood was dried under these conditions to a moisture content of less than 10 wt %. This step is referred to as the "toasting" step.

The runs were repeated using, instead of water, respectively: 5% by weight of the wood of NaOH, dissolved in 30 kg water; a 20% by weight of the wood of $K_2CO_3$ dissolved in 30 kg water; 5% by weight of the wood of NaOH and 10% by weight of the wood of CaO, dissolved resp. slurried in 30 kg water; and 10% by weight of the wood of $K_2CO_3$ and 10% by weight of the wood of Mg—Al oxide, dissolved and slurried in water.

From each run, a 3 g sample was ground in a household coffee grinder for 40 seconds. The ground material was screened with 150 μm; 500 μm; and 1000 μm screens to obtain particle size distributions. The results are presented in Table 1, and in FIG. 1.

TABLE 1

| Pretreatment | % Additive | <150 μm | 150-500 μm | 500-1000 μm | >1000 μm |
|---|---|---|---|---|---|
| None | None | 0.0% | 22.0% | 41.5% | 36.6% |
| Kneading/toasting | None | 0.0% | 36.1% | 47.5% | 16.4% |
| Kneading/toasting | 5% NaOH | 0.0% | 50.8% | 41.5% | 7.7% |
| Kneading/toasting | 20% $K_2CO_3$ | 3.6% | 72.3% | 21.1% | 3.0% |
| Kneading/toasting | 10% CaO + 5% NaOH | 15.5% | 63.8% | 17.5% | 3.2% |
| Kneading/toasting | 10% $K_2CO_3$ 10% Mg—Al mixed oxide | 7.9% | 34.4% | 42.0% | 15.7% |

Untreated sawdust is resilient and withstands particle size reduction. The kneading/toasting pretreatment results in a wood material that is brittle and can be pulverized by rubbing it between one's fingers.

The effect of the pretreatment is illustrated by the grinding experiments. All samples were of equal weight (3 g), and were ground in the same grinder for the same duration. As a result of the pretreatment, the particle size reduction resulting from the standardized grinding was significantly increased.

The effect is further amplified by the inorganic additives that were present during the kneading/toasting pretreatment.

As has been disclosed in WO2007/128800, it is advantageous to intimately mix the biomass material with a particulate inorganic material. This is best done before the toasting step, when the biomass material is still soft and resilient. The preferred particulate inorganic material is a catalytic material. Particularly preferred are the carbonates, hydroxides and oxides of alkali and earth alkaline metals, in particular, NaOH, KOH, $Na_2CO_3$, and $K_2CO_3$, MgO, MgCO3, Mg(OH)2, CaCO3, Ca(OH)2, CaO, Al(OH)3, Al2(SO4)3, phosphate salts, or mineral acids.

Another class of preferred catalytic materials are mixed metal oxides, layered cationic materials, natural clays such as bentonite or dolomite, and hydrotalcite-like materials. Combinations of an alkali metal carbonate and a hydrotalcite-like material (including hydrotalcite per se), are highly preferred.

Yet another class of suitable catalytic materials are the crystalline aluminosilicates, such as zeolites.

It is advantageous to create an intimate mixture of the biomass material with a particulate inorganic catalyst material. This is best done prior to the toasting process, when the solid biomass material is still relatively soft. The mixing may be accomplished by mechanical action. Suitable methods for creating such intimate mixtures include mechanical process, such as screw conveying, milling, grinding, kneading, extruding, and the like and combinations thereof.

In an alternate embodiment the solid biomass material is impregnated with an inorganic material in the form of a solution or colloidal suspension, such impregnation is carried out before the step of exposing the solid biomass material to the toasting temperature. Preferably, the biomass material is impregnated with a solution of an inorganic material in a suitable solvent, prior to exposing the biomass material to the toasting temperature. Water and aqueous liquids are examples of preferred solvents. Examples of preferred inorganic materials include the carbonates and the hydroxides of alkali metals and earth alkaline metals, in particular the hydroxides and carbonates of sodium and potassium.

In yet another embodiment the solid biomass is impregnated with a solution or colloidal suspension of a soluble inorganic material and intimately mixed with an insoluble, particulate inorganic material, prior to exposing the solid biomass to the toasting temperature. The steps of impregnating the solid biomass with a solution of an inorganic material and of intimately mixing the solid biomass with a particulate inorganic material may be combined, or may be carried out in sequence. Preferred soluble inorganic materials are the hydroxides and carbonates of sodium and potassium. Preferred insoluble, particulate inorganic materials are layered anionic materials, in particular hydrotalcite and hydrotalcite-like materials.

Another aspect of the present invention is the material obtained by the toasting process. The material is more brittle than the solid biomass starting material. Its main characteristic is that its particle size may be reduced mechanically, requiring a much lower energy input than the solid biomass material from which it is derived.

Yet another aspect of the present invention is a solid biomass material that has been subjected to the toasting process, followed by a particle size reduction step. Desirably this material has a mean particle size in the range of 10 micrometers to 5 millimeters. The material optionally contains one or more inorganic catalyst materials.

Yet another aspect of the present invention involves that toasted biomass material is liquefied by a process including chemical, hydrothermal, hydropyrolytic, or enzymatic conversion.

Yet another aspect of the present invention involves that toasted biomass material is converted to liquid and gaseous products in a pyrolysis or catalytic pyrolysis process.

Yet another aspect of the present invention involves that toasted biomass material is converted to gaseous products in a gasification process.

The above material may be subjected to a conversion process to form liquid and/or gaseous products. Examples of such processes include pyrolysis, biomass catalytic cracking, hydrothermal upgrading, and gasification.

Depending on its origin, the solid biomass feedstock may contain from 1% to more than 20% minerals, generally referred to as "ash". High ash contents are generally undesirable, as they lead to uncontrolled catalytic reactions during the conversion process. As a result, liquid product produced in the conversion reaction may be of poor quality in terms of a dark color and a high acid number of the liquid product. For this reason it may be desirable to remove the ash from the solid biomass prior to subjecting the solid biomass to the conversion process.

Ash removal may be carried out prior to or after the toasting process. In general it is desirable to carry out the ash removal step before the addition of the catalytic material, so that no catalytic material is removed during the ash removal step. In general, ash removal may be carried out before or after the toasting process.

Ash removal may comprise soaking the biomass with water or an aqueous solvent. An example of an aqueous solvent is an aqueous solution of ammonium hydroxide. Preferred are solutions of ammonium hydroxide having a pH in the range of 8 to 10. Subsequently the water or aqueous solvent, containing dissolved ash, is removed from the biomass e.g. in a filter press or a kneader. Ash removal may be further enhanced by repeating the soaking and the pressing steps.

In an alternate embodiment, the biomass is contacted with $CO_2$ at or near critical conditions. $CO_2$ is produced in large quantities during the biomass conversion process, and is therefore plentiful at the biomass processing, site. The use of (near) critical $CO_2$ has the additional advantage of opening up the structure of the biomass upon rapid expansion of the solvent. The same result can be obtained by flash drying of wet biomass, described in more detail below.

In an alternative embodiment, prior to toasting of the solid biomass material, the solid biomass material is prepared by: (i) providing biomass particles having a moisture content of at least 20 wt. %, more preferably at least 30 wt. %; and (ii) subjecting the biomass particles to flash heating.

Step (i) can further comprise contacting the biomass particles with a swelling aid selected from the group consisting of water soluble bases, water soluble acids, water soluble salts, and mixtures thereof. The swelling aid can comprise at least one cation selected from the group consisting of K; NH4; Na; Ba; Mn; Mg; Ca; Li; and Zn; or at least one anion selected from the group consisting of ClO3; SO4; SO3; NO3; Cl; Br; ClO4; I; CNS; HSO4; OH; HCO3; HSO3; (OH)CO3. The swelling aid can also comprise at least one compound selected from the group consisting of a salt of 1) an alkali metal, an alkaline-earth metal, a transition metal, or a rare earth metal; and 2) an aluminum-containing anion; and combinations thereof.

The flash heating can comprise increasing the temperature from 80° C. or below to 120° C. or above in less than 30 seconds, preferably less than 10 seconds. The flash heating can also be followed or accompanied by a pressure drop.

In accordance with another embodiment, the toasted biomass material can be contacted with an aqueous liquid sufficient to increase the moisture content to at least 20 wt. %, forming wet-toasted biomass particles; and (ii) subjecting the wet-toasted biomass particles to flash heating.

Step (i) can further comprise contacting the biomass particles with a swelling aid selected from the group consisting of water soluble bases, water soluble acids, water soluble salts, and mixtures thereof. The swelling aid can comprise at least one cation selected from the group consisting of K; NH4; Na; Ba; Mn; Mg; Ca; Li; and Zn; or at least one anion selected from the group consisting of ClO3; SO4; SO3; NO3; Cl; Br; ClO4; I; CNS; HSO4; OH; HCO3; HSO3; (OH)CO3. The swelling aid can also comprise at least one compound selected from the group consisting of a salt of 1) an alkali metal, an alkaline-earth metal, a transition metal, or a rare earth metal; and 2) an aluminum-containing anion; and combinations thereof.

The flash heating can comprise increasing the temperature from 80° C. or below to 120° C. or above in less than 30 seconds, preferably less than 10 seconds. The flash heating can also be followed or accompanied by a pressure drop.

In an alternative embodiment, prior to or following the toasting of solid biomass material, the solid biomass material can be exposed to a pressure swing explosion by: (i) exposing, at a high pressure, said solid biomass material to a compound selected from the group consisting of steam, ammonia and $CO_2$; and (ii) allowing the pressure to be reduced to a low pressure. The pressure and temperature of the gas in step (i) can be such that at least a portion of the gas is liquefied. The low pressure in step (ii) is below the high pressure of step (i) and can be sufficiently low such that substantially all of the compound is in the form of a gas.

Such processes are disclosed in more detail in U.S. Pat. No. 5,693,296, Holtzapple, et al., granted Dec. 2, 1997; U.S. Pat. No. 5,865,898, Holtzapple, et al., granted Feb. 2, 1999; and in article entitled "Effects of Temperature and Moisture on Dilute-Acid Steam Explosion Pretreatment of Corn Stover and Cellulase Enzyme Digestibility", by Tucker, Kim, Newman and Nguyen, found in Applied Biochemistry and Biotechnology, Vol. 105, No. 1-3, Spring 2003.

Ash removal is enhanced if the solid biomass material is soaked in water prior to the pressing step. In an alternate embodiment ash removal is carried out after the toasting process. Since water is removed from the biomass material during the toasting step, it is generally necessary to precede the pressing step with, a soaking step. It is advantageous to use hot water or wet steam for the soaking step. In this embodiment it is preferred to subject the toasted biomass material to a particle size reduction step prior to the ash removal process. The reduced particle size greatly enhances the accessibility of the biomass, thereby making the ash removal step more efficient. After the ash removal step, the solid biomass may be mixed with one or more catalytic materials, by impregnation and/or mechanical mixing, if the presence of a catalyst is desired in a subsequent conversion process.

While the reactor used for the process of the invention may be commercial scale, the process described herein allows control over solid biomass feedstock in terms of particle size and ash content, making the material obtained by the process particularly suitable for use in biomass conversion tests. The invention therefore further comprises use of toasted biomass material in a test reactor. The test reactor may be of laboratory scale or of pilot plant scale, and may be batch-type or continuous.

What is claimed is:

1. A process for the conversion of a modified biomass material, said process comprising:
    (a) mixing a solid biomass material with an inorganic material, thereby to produce a solid biomass material mixture;
    (b) exposing the solid biomass material mixture to a toasting temperature in the range of from 105° C. to 140° C. during an exposure time of from 1 minute to 12 hours and under conditions wherein biomass conversion is avoided, thereby to produce a modified biomass material having reduced resistance to mechanical disintegration; and
    (c) subjecting the modified biomass material to a conversion reaction,
    wherein, prior to or following step (b), the solid biomass material mixture or the modified biomass material is subjected to flash heating.

2. The process of claim 1 wherein step (b) is carried out in the presence of steam or in an atmosphere that is substantially oxygen-free.

3. The process of claim 1 wherein step (a) comprises intimately mixing the solid biomass material with a particulate inorganic material.

4. The process of claim 3 wherein the particulate inorganic material comprises a catalyst.

5. The process of claim 4 further comprising the step of reducing the mineral content of the solid biomass material prior to step (a), wherein the step of reducing the mineral content comprises soaking the solid biomass material with an aqueous solvent and removing minerals by filtration;
    and wherein:
    step (b) is carried out in the presence of steam;
    the solid biomass material is a lignocellulosic biomass material;
    the particulate inorganic catalyst is selected from the group consisting of carbonates, hydroxides and oxides of alkali and earth alkaline metals, mixed metal oxides, layered cationic materials, natural clays, hydrotalcite-like materials, crystalline aluminosilicates, and combinations thereof;
    step (b) is conducted in a fluidized bed, fixed bed, transported bed or ebullated bed type of reactor; and
    the modified biomass material has a reduced resistance to mechanical disintegration.

6. The process of claim 1 wherein step (a) comprises impregnating the solid biomass material with the inorganic material in the form of a solution or colloidal suspension.

7. The process of claim 1 wherein step (a) comprises intimately mixing the solid biomass material with a particulate inorganic catalyst material, impregnating the solid biomass material with an inorganic material, or intimately mixing the solid biomass material with a particulate inorganic catalyst material and impregnating the solid biomass material with an inorganic material, said inorganic material being in the form of a solution or colloidal suspension, said step (a) being carried out before step (b).

8. The process of claim 7 wherein step (a) comprises intimately mixing the solid biomass material with a particulate inorganic catalyst material and impregnating the solid biomass material with an inorganic material, and further comprising the step of reducing the mineral content of the solid biomass material prior to step (a), wherein the step of reducing the mineral content comprises soaking the solid biomass material with an aqueous solvent and removing minerals by filtration;
    and wherein:
    the solid biomass material is a lignocellulosic biomass material:
    the particulate inorganic catalyst is selected from the group consisting of layered anionic materials;
    the inorganic material is selected from the group consisting of hydroxides and carbonates of sodium and potassium;
    step (b) is conducted in a fluidized bed, fixed bed, transported bed or ebullated bed type of reactor; and
    the modified biomass material has a reduced resistance to mechanical disintegration.

9. The process of claim 1 wherein the solid biomass material is contacted with an organic compound before or during step (b), wherein the organic compound is in the form of a solution, including a water phase derived from a pyrolysis process.

10. The process for the conversion of the modified biomass material of claim 1 wherein the conversion reaction of step (c) comprises pyrolysis, biomass catalytic cracking, hydrothermal upgrading, gasification, chemical conversion, hydrothermal conversion, hydropyrolytic conversion, enzymatic conversion, or a combination thereof.

11. A process for the conversion of the modified biomass material of claim 5 wherein the conversion reaction of step (c) comprises pyrolysis, biomass catalytic cracking, hydrothermal upgrading, gasification, chemical conversion, hydrothermal conversion, hydropyrolitic conversion, enzymatic conversion, or a combination thereof.

12. The process of claim 1 wherein before said flash heating said solid biomass material mixture or modified solid biomass material has a moisture content of at least 20 wt. %.

13. The process of claim 1 wherein:
said step of flash heating occurs prior to step (b);
wherein the flash heating comprises increasing the temperature from 80° C. or below to 120° C. or above in less than 30 seconds, and
wherein the flash heating is followed or accompanied by a pressure drop.

14. The process of claim 12 wherein:
said step of flash heating occurs after step (b) and said modified solid biomass material is contacted with an aqueous liquid sufficient to increase the moisture content to at least 20 wt. % prior to said flash heating;
wherein the flash heating comprises increasing the temperature from 80° C. or below to 120° C. or above in less than 30 second; and
wherein the flash heating is followed or accompanied by a pressure drop.

15. The process of claim 12 wherein the flash heating further comprises contacting the solid biomass material mixture or modified solid biomass material prior to said flash heating with a swelling aid selected from the group consisting of water soluble bases, water soluble acids, water soluble salts, and mixtures thereof to provide a moisture content of at least 20 wt. %.

16. The process of claim 15 wherein the swelling aid comprises at least one cation selected from the group consisting of K, NH4, Na, Ba, Mn, Mg, Ca, Li, and Zn, or at least one anion selected from the group consisting of ClO3, SO4, SO3, NO3, Cl, Br, ClO4, I; CNS, HSO4, OH, HCO3, HSO3, and (OH) CO3.

17. The process of claim 15 wherein the swelling aid comprises at least one compound selected from the group consisting of a salt of: 1) an alkali metal, an alkaline-earth metal, a transition metal, or a rare earth metal; and 2) an aluminum-containing anion; and combinations thereof.

18. The process of claim 1 further comprising reducing the mineral content of the solid biomass material prior to step (a), wherein the step of reducing the mineral content comprises soaking the solid biomass material with an aqueous solvent and removing minerals by filtration.

19. The process of claim 1 further comprising contacting the solid biomass prior to step (a) with an aqueous solution, wherein the aqueous solution is selected from the group consisting of water soluble bases, water soluble acids, water soluble salts and mixture thereof.

20. The process of claim 1 further comprising subjecting the solid biomass material to flash heating prior to step (a).

21. A process for the conversion of a modified biomass material, said process comprising:
(a) mixing a solid biomass material with an inorganic material, thereby to produce a solid biomass material mixture;
(b) exposing the solid biomass material mixture to a toasting temperature in the range of from 105° C. to 140° C. during an exposure time of from 1 minute to 12 hours and under conditions wherein biomass conversion is avoided, thereby to produce a modified biomass material having reduced resistance to mechanical disintegration; and
(c) subjecting the modified biomass material to a conversion reaction,
wherein prior to or following step (b), the solid biomass material mixture or modified solid biomass material is exposed to a pressure swing explosion by:
(i) exposing, at a high pressure, said solid biomass material mixture or modified biomass material to a compound selected from the group consisting of steam, ammonia and $CO_2$; and
(ii) allowing the pressure to be reduced to a low pressure;
wherein the pressure and temperature of said compound in step (i) are such that at least a portion of said compound is liquefied; and wherein said low pressure in step (ii) is below said high pressure of step (i) and sufficiently low such that substantially all of said compound is in the form of a gas.

* * * * *